May 23, 1961
J. CADIOU
2,985,444
HYDRAULIC MEANS FOR CONTROLLING HIGH-AMPLITUDE
OSCILLATION FOR SUSPENSION SYSTEMS
Filed May 13, 1958
7 Sheets-Sheet 4
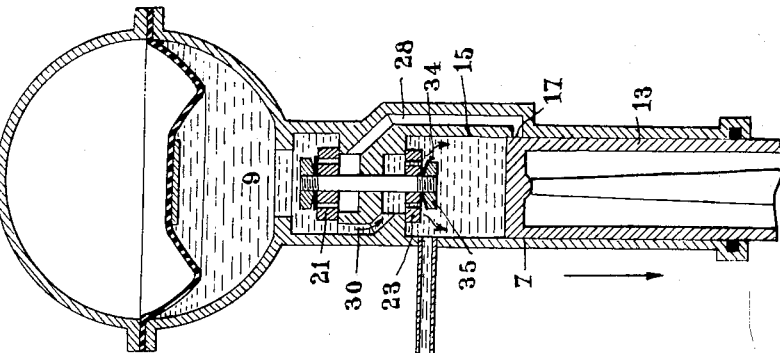
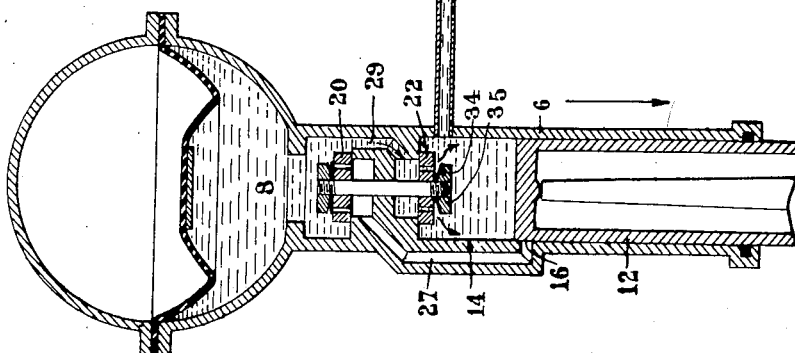
Fig. 4.

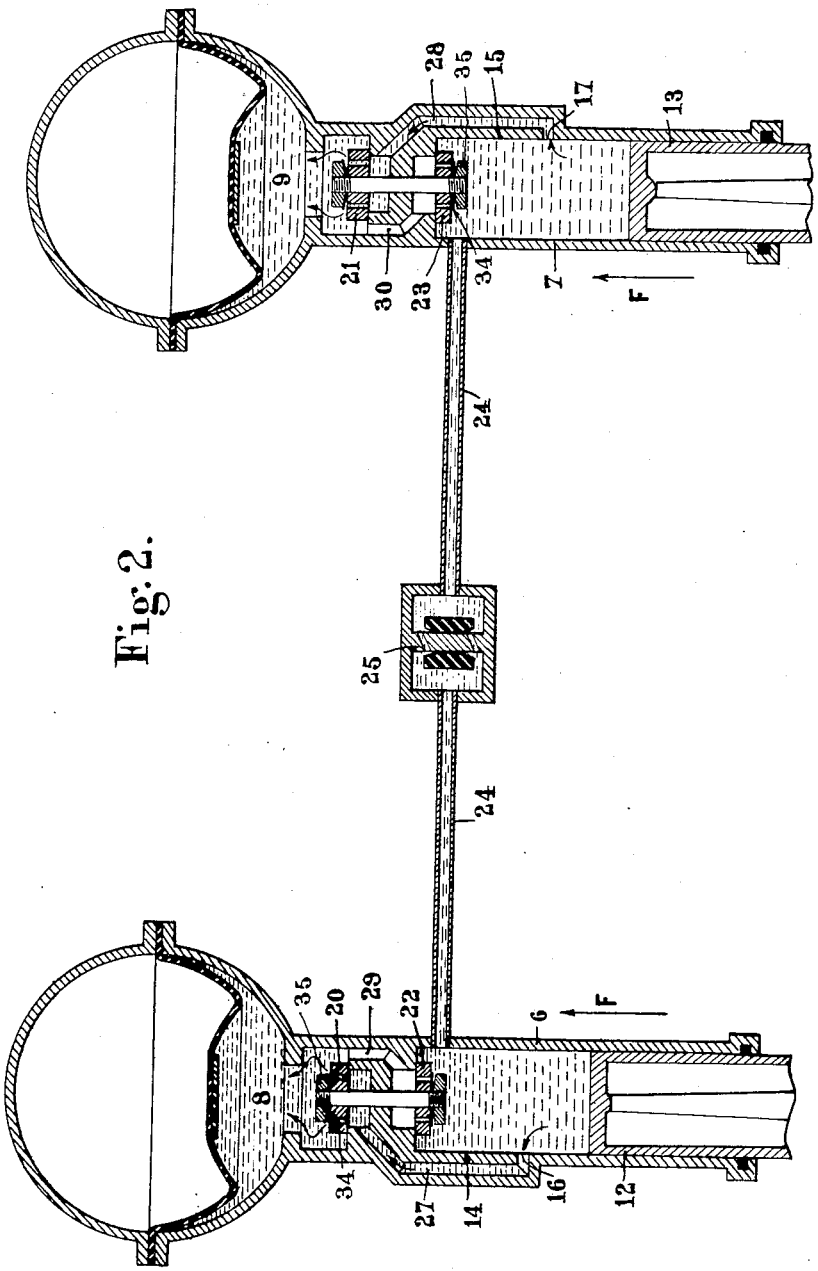

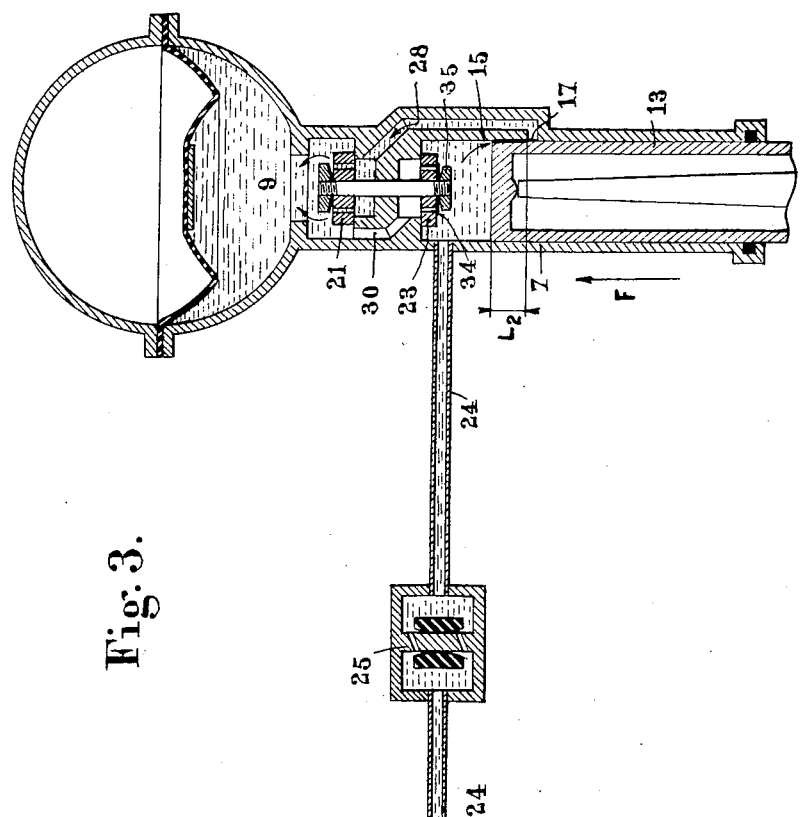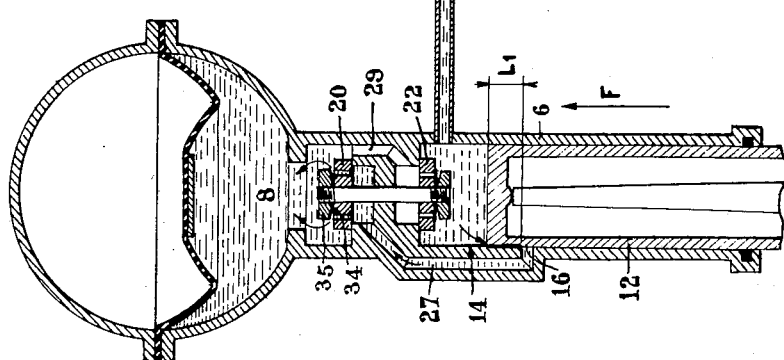

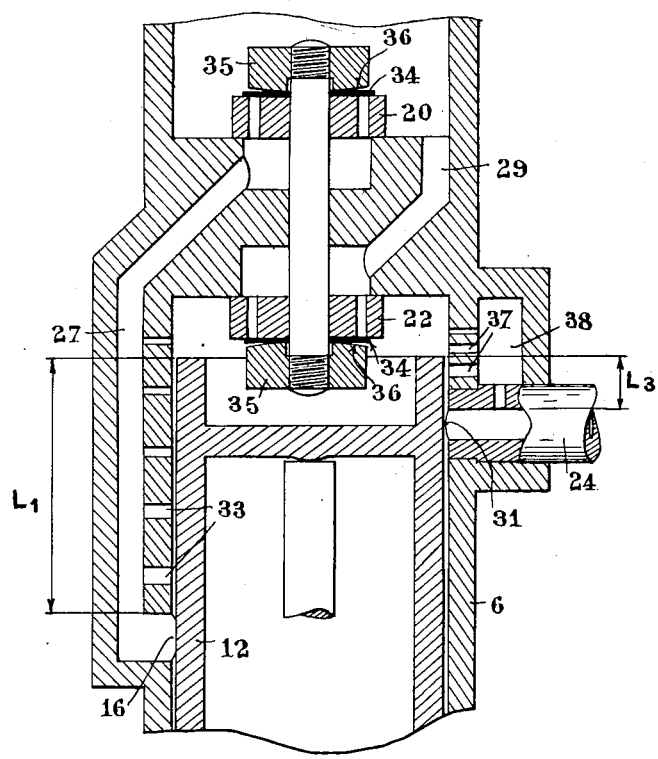

United States Patent Office 2,985,444
Patented May 23, 1961

2,985,444
HYDRAULIC MEANS FOR CONTROLLING HIGH-AMPLITUDE OSCILLATION FOR SUSPENSION SYSTEMS

Jean Cadiou, Paris, France, assignor to Societe Anonyme Andre Citroen, Paris, France Filed May 13, 1958, Ser. No. 734,895

Claims priority, application France June 21, 1957

4 Claims. (Cl. 267—15)

The present invention relates to suspension systems of automotive vehicles and has specific reference to improved hydraulic means for controlling high-amplitude oscillation in such systems.

The damping of high-amplitude oscillation caused by road shocks and irregularities, such as on high-crowned roads, open transverse gutters and the like, constitutes a very difficult problem, especially in the extremely flexible suspension systems now becoming increasingly popular. Each time the road irregularity to be negotiated by a vehicle is such that the movements imparted to the sprung portion of the vehicle exceed the clearance permitted by the suspension system, a shock occurs between the sprung and unsprung portions of the vehicle, which is usually checked by resilient stop members. However, these stop members absorb only one fraction of the energy the greater part of which is returned in the form of rebound.

A similar fact is observed when a momentary deformation transmits low-amplitude stresses or impulses to the zone surrounding the aforesaid resilient stop; this is actually the case when the vehicle negotiates curves having a banking road surface, with the obvious consequence that the efficiency of the suspension system is impaired as far as normal road irregularities are concerned.

It has already been proposed to interpose an adjustable member for controlling the passage of fluid in a pipe line interconnecting the two hydraulic shock absorbers of a same axle; another proposition was to take advantage, in a hydropneumatic suspension system, of the pressure losses occurring during the transfer of fluid in opposite directions between shock absorbers interconnected with each other and a pressurized accumulator for actuating a member counteracting the transfer of fluid in one or the other direction.

Finally, a recent proposition consisted in causing the fluid to be transferred through grooves having either a progressively decreasing cross-sectional area, or a constant cross-sectional area and a progressively decreasing length, in order to retard the action of hydropneumatic shock absorbers.

So far as the applicant is aware, all these known propositions failed to properly damp out the shocks occasioned by oscillation exceeding the permissible or normal clearance of suspension systems.

Now it is the specific object of this invention to substitute a braking device capable of absorbing shocks of an amplitude greater than a predetermined value for the conventional resilient stop member.

To this end, the suspension system comprises in the known fashion and for each wheel a hydraulic suspension cylinder secured on the chassis or frame of the vehicle, the outer end of the piston rod of each cylinder being pivotally mounted on the swinging arm of the relevant wheel, and a hydropneumatic shock absorber; besides, the two cylinders of a same axle are interconnected by a pipe line of relatively large cross-sectional area and the two swinging arms or wheel carriers are interconnected through a torsion bar acting as an anti-roll sway bar.

According to this invention, each suspension cylinder comprises a gauged bore in which the suspension piston is slidably mounted, said cylinder being formed with at least two orifices, one of these orifices being located at the point corresponding to the maximum stroke of the piston and connecting the relevant cylinder to the aforesaid pipe line, the other orifice being located approximately at mid-stroke and connected through a compression damping device to the hydropneumatic unit, this damping device opening only to permit the passage of fluid from the cylinder to said unit.

Another connection is provided between the hydropneumatic unit and the cylinder through an expansion damping device which opens only to permit the passage of fluid from the unit to said cylinder.

With this arrangement, during an initial portion of the piston movement, the fluid circulating between the cylinder and the unit and vice-versa is retarded to a degree selectively adjustable by the action of the compression and expansion damping devices. During a subsequent or second portion of this movement, as the piston in the suspension cylinder attains a predetermined position, this selective retarding action is eliminated and a considerably more powerful braking action is substituted therefor, in the form of a throttling of the liquid which takes place in the residual clearance provided between the cylinder and piston walls.

During this second portion of the piston movement the communication between the two cylinders may be either maintained integrally or regulated by means constituting an alternate form of embodiment of this invention. As this communication is also provided with a hydraulic damper, the rolling movements are also controlled, the object of the aforesaid alternate form of embodiment consisting in reinforcing this damping action when high-amplitude movements take place.

In order to afford a clearer understanding of this invention and of the manner in which the same may be carried out in the practice, reference will now be made to the accompanying drawings forming part of this specification and illustrating diagrammatically by way of example a preferred form of embodiment of the high-amplitude damping device for a suspension system, according to this invention. In the drawings:

Figures 2, 3, 4 and 5 are axial sections illustrating the different operative positions of the component elements of the device; and Figures 6 and 7 are axial sections showing modified embodiments of parts of the device.

Figure 1:
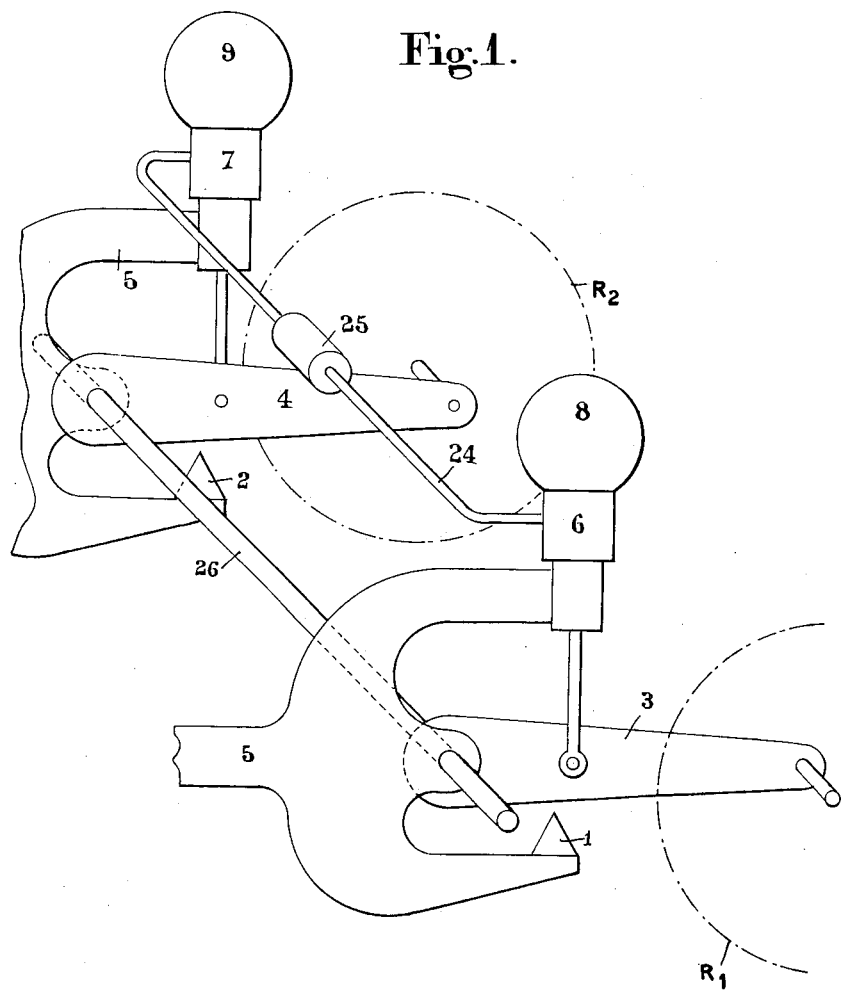
Figure 1 illustrates diagrammatically in isometric view the general arrangement of the invention.

The support 3 or 4 of each wheel $R_1$ or $R_2$ is pivotally mounted on the frame 5 of the vehicle. Rigidly secured on this frame and overlying each support 3 or 4 is a vertical cylinder 6 or 7 comprising a tubular wall opening at the bottom with a circular aperture, and an upper closure member. A cylindrical piston 12 or 13 mounted in fluid-tight engagement in the circular aperture of the cylinder, slidably fitted in this cylinder and provided with a rod pivoted on the wheel support 3 or 4 defines in each cylinder 6 or 7 a compression chamber. A hydropneumatic unit 8 or 9 is mounted above the upper closure member of each cylinder 6 or 7 and a liquid fills completely this compression chamber and partially the hydropneumatic unit. The upper closure member of each cylinder has formed therethrough a passage or duct 29 or 30 permitting the communication between the hydropneumatic unit 8 or 9 and the compression chamber of cylinder 6 or 7 and a check valve 22 or 23 mounted in this passage throttles the liquid flowing from the hydropneumatic unit to the compression chamber so as to counteract any backflow of this liquid in the opposite direction. The tubular wall of each cylinder 6 or 7 has formed therein another passage or duct 27 or 28 whereby the compression chamber may communicate with the hydropneumatic unit, this second passage having a radial inlet port opening in the compression chamber beneath the level of the upper closure member and an outlet port extending through this upper closure member so as to open into the hydropneumatic unit. Mounted in each of these passages 27 or 28 is a check valve 20 or 21 for throttling the liquid flowing from the compression chamber to the hydropneumatic unit so as to counteract any backflow of this liquid in the opposite direction.

The suspension cylinders 6, 7 of a same axle are interconnected by a pipe line 24 of relatively large cross-sectional area permitting the circulation of fluid from one cylinder to the other.

At mid-length this pipe line 24 has inserted therein a damping device 25 adapted to retard the flow of fluid in either direction.

The two swinging arms 3, 4 are interconnected by an anti-roll or sway bar 26 limiting the angular movements of the frame 5 relative to the ground.

The device so far described is effective only as an upper stop for checking the oscillation of the carrier arm, for the quality of the suspension needs improving only in this direction; the provision of counter-rebound check members is dictated by mechanical reasons alone; to this end, the expansion or downward movements of the arms 3, 4 are limited by conventional rubber pads 1, 2 secured on the frame 5. The operation of the arrangement described hereinabove is as follows:

(1) The road surface causes the wheels to move simultaneously upwards, that is, in the direction of the arrow F.

Figure 1 shows the device during the compression movement of the carrier arms of the two suspension devices from the final expansion stroke of the pistons to the final compression stroke of the pistons, as illustrated in Fig. 3.

Due to the upward movements of the arms 3, 4 the pistons 12, 13 compress and force the fluid out from the suspension cylinders 6, 7 through the ports 16, 17 and ducts 27, 28; this fluid is led into the pneumatic units 8, 9 across the compression damping device 20, 21 and the shock absorber operates normally.

During the entire compression stroke of the pistons 12, 13 the fluid is constantly retarded by the compression damping device 20, 21 permitting the circulation of the fluid only in the direction from the cylinder 6, 7 to the hydropneumatic unit 8, 9.

During the movement of the pistons 12, 13 in cylinders 6, 7 the ports 16, 17 become obturated as shown in Fig. 3, so that the fluid is forced through the clearance left between the cylinders 6, 7 and pistons 12, 13 along the distance $L_1$–$L_2$ becoming progressively greater, whereby the movement of the pistons 12, 13 in cylinders 6, 7 and therefore the end-stroke shock applied to the vehicle are retarded by a considerable force.

Meanwhile, the fluid pressure increases in the pipe line 24 with a moderate circulation between the cylinders 6, 7 which is only subordinate to their pressure differential.

A modified form of embodiment may be contemplated wherein the clearance between the cylinder and piston is just strictly necessary to permit the safe relative sliding of these two parts, the cylinder wall above the port 16 (or 17) comprising a series of small gaged holes arranged in stepped relation to each other and of decreasing diameter towards the upper end of the cylinder, in order to increase the braking action as the piston advances towards this cylinder end.

(2) The two wheels of the axle considered herein move in a direction opposite to the arrow F.

The compression damping devices 20, 21 counteract the return flow of the fluid from the hydropneumatic units 8, 9 to the cylinders 6, 7; the fluid flows back through the expansion damping devices 22, 23 as the pistons move downwards, these devices permitting only the passage of fluid in the aforesaid direction through the ducts 29, 30. The uncovering of ports 16, 17 has not any specific consequence in this direction of movement of the pistons. The fluid flow in pipe line 24 is moderate or null, except for the difference of oscillation that may exist between the wheels (Fig. 4).

Figure 5:
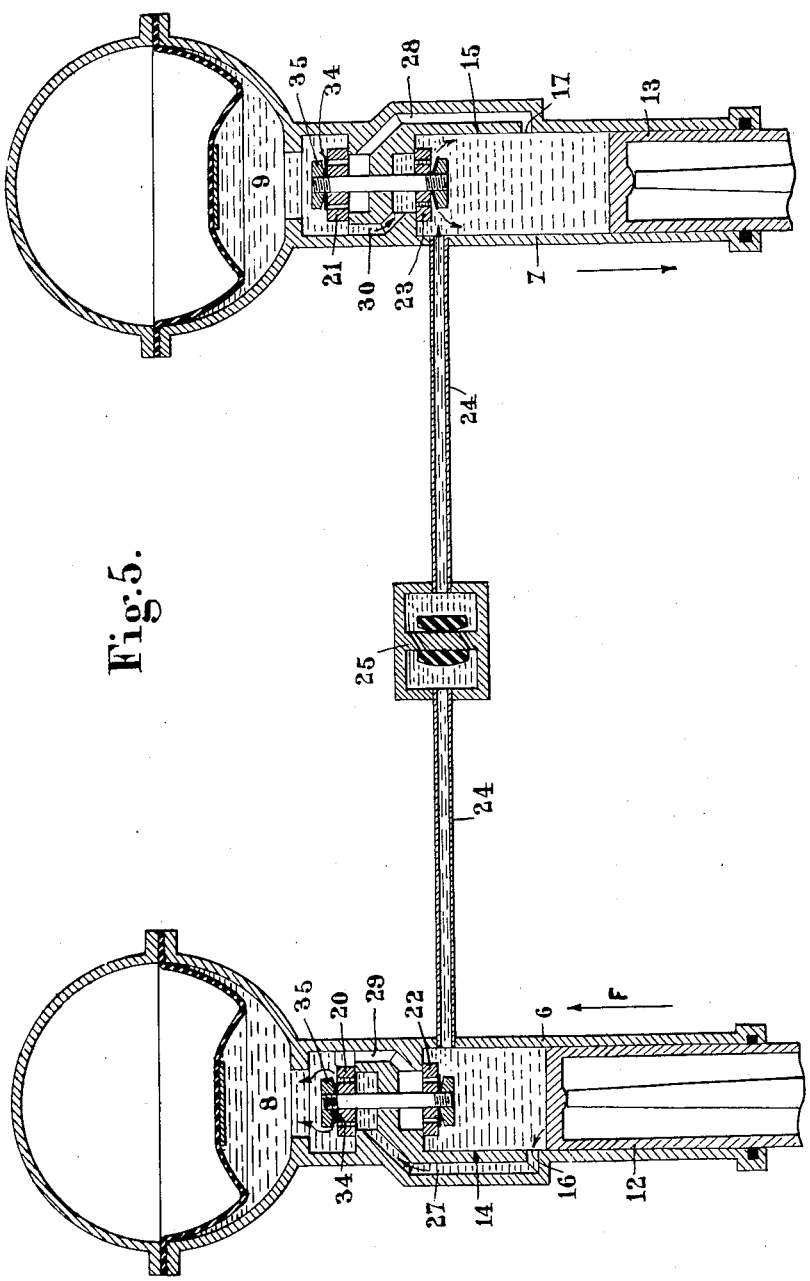

(3) If only one wheel is moved upwards, the operation of the suspension device associated with this specific wheel will take place as described in section (1) hereabove, but as the pressure increases on this side, an increasingly stronger fluid circulation takes place through the pipe line 24, this flow being controlled by the intermediate damping device 25. This transfer of fluid from one to the other cylinder increases the pressure in this cylinder and tends to lift the vehicle on this side, thereby producing an anti-roll action as illustrated in Fig. 5.

(4) In the reverse case of a wheel moving downwards the operation is similar to that described in section (2) hereabove, except that the fluid flows back from the other cylinder, this liquid flow being also retarded by the intermediate damping device 25. This delivery of fluid from the other wheel cylinder decreases as the pressures produce a balancing action and tends to impress on the unstressed side of the vehicle a pulse of same direction as that received by the first side, and under the new conditions thus produced the rolling movements are controlled by a greater force.

Figure 6:
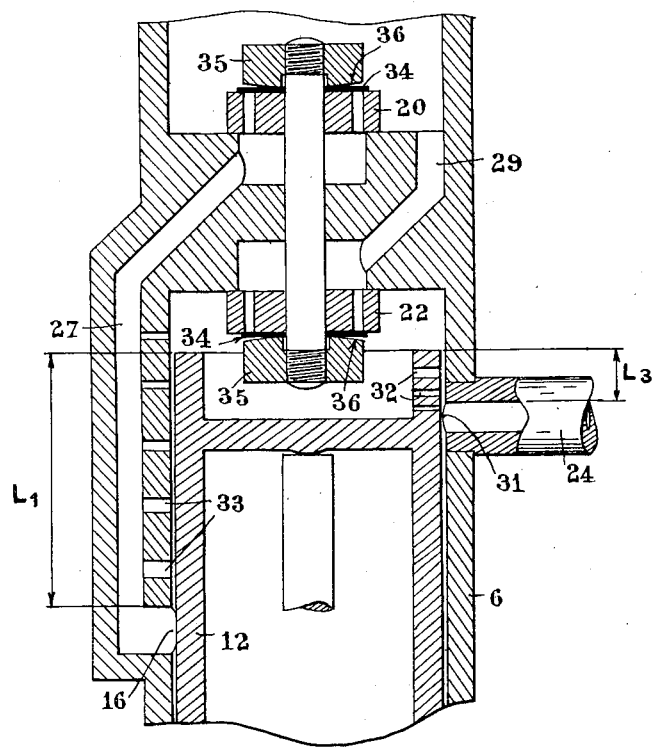

An alternate form of embodiment affording a stronger braking of the rolling movements or small pulses occurring when at least one of the pistons is approaching the upper end of the relevant cylinder has been suggested hereabove. This alternate embodiment is illustrated in Fig. 6 and consists of a special arrangement of the port 31 communicating with the pipe line 24 which is obturated when the piston moves beyond a predetermined height. In all the positions above this height a braking action is exerted on the fluid which is proportional to the distance $L_3$ and superposed to the braking action corresponding to $L_1$ during simultaneous movements of the two wheels, this additional braking action being exerted separately in case of rolling movements, thereby creating a more powerful braking effect than that provided by the double-acting damping device 25.

In a manner similar to that consisting in reducing the clearance between the cylinder and piston while forming gaged holes through the cylinder wall above the port 16 (or 17), an alternate arrangement consists in utilizing under the same conditions a piston having the minimum clearance relative to the cylinder and either forming in the wall of the piston crown a plurality of holes 32 (see Fig. 6) of decreasing diameters in the downward direction, or, as shown in Fig. 7, forming in the cylinder wall holes 37 of decreasing diameters in the upward direction, provided that a chamber 38 connecting these holes to the pipe line 24 is formed externally of this cylinder wall.

These Figures 6 and 7 show a specific embodiment of the compression and expansion damping devices, whereby a resilient washer 34 is clamped between the body of the damping device and the clamping nut proper 35. This nut is formed with a curved face 36 adapted to be engaged more or less by the washer 34 according to the intensity of the fluid pressure variation.

Of course, many modifications may be brought to the forms of embodiment shown in the accompanying drawings and described hereinabove without departing from the spirit and scope of the invention as set forth in the appended claims. Thus, the hydropneumatic unit 8, 9, the wheel swinging arm 3, 4 and the sway or anti-roll bar 26 may be constructed in any other known and suitable manner, the shape, relative dimensions and arrangement of these members being given by way of example only and with a view to afford a clear understanding of the invention.

What I claim is:

1. A hydropneumatic suspension unit for the frame of a vehicle comprising a wheel support pivoted on the frame, a substantially vertical cylinder rigid with said frame, said cylinder comprising a tubular wall formed with a lower circular aperture and an upper closure member, a cylindrical piston in fluid-tight engagement in said circular aperture and slidably mounted in said cylinder, said piston defining with said cylinder a compression chamber and having a rod pivoted on said wheel support, a hydropneumatic assembly mounted above said upper closure member, a liquid medium filling completely said compression chamber and partially said hydropneumatic assembly, a fluid duct extending through said upper closure member to permit the circulation of said liquid from said hydropneumatic assembly to said compression chamber, a check valve mounted in said duct to prevent the liquid contained in said compression chamber from flowing through said duct into said hydropneumatic assembly, another duct formed in said tubular wall and said upper closure member to permit the circulation of said liquid from said compression chamber to said hydropneumatic assembly, said other duct having an inlet orifice opening in a radial direction into said compression chamber through said tubular wall of said cylinder at a level below said upper closure member and an outlet orifice extending through said upper closure member and leading into said hydropneumatic assembly, another check valve mounted in said other duct and adapted to prevent the liquid contained in said hydropneumatic assembly from flowing through said other duct into said compression chamber, and passage means between said compression chamber and said other duct permitting the liquid contained in said compression chamber to flow into said other duct through a passage of gradually decreasing cross-sectional area as said piston rises in said cylinder above the level of said inlet orifice of said other duct and obturates said other duct inlet orifice.

2. A hydropneumatic suspension unit for the frame of a vehicle, comprising for each pair of wheels two wheel supports pivoted on the frame of the vehicle, two substantially vertical cylinders rigid with said frame, each cylinder comprising a lateral wall formed with a lower circular aperture and an upper closure member, a pair of cylindrical pistons each in fluid-tight engagement in the circular aperture of, and slidably mounted in, the corresponding cylinder, said pistons forming a compression chamber with the respective cylinder and having rods associated therewith, each rod being pivoted on the corresponding wheel support, a pair of hydropneumatic assemblies mounted above said upper closure members of the cylinders, a liquid filling completely said compression chambers and partially said hydropneumatic assemblies, a fluid duct extending through the upper closure member of each cylinder to permit the circulation of said liquid from each hydropneumatic assembly to the underlying compression chamber, a flow-retarding and flow-stopping check valve mounted in said duct for throttling the passage of liquid contained in said hydropneumatic assembly to the compression chamber underlying the respective hydropneumatic assembly and preventing the passage of liquid contained in said compression chamber of said cylinder to said hydropneumatic assembly mounted on the respective cylinder, another liquid circulation duct formed in each tubular wall and the upper closure member of each cylinder between the compression chamber of the cylinder and the hydropneumatic assembly overlying the same cylinder, each of said other liquid circulation ducts having an inlet port opening radially into the compression chamber of the cylinder through the tubular wall thereof at a level below the upper closure member, and an outlet port extending through the upper closure member of said cylinder and leading into the hydropneumatic assembly overlying the same cylinder, another flow-retarding and flow-stopping check valve mounted in each of said other ducts, said other check valve being adapted to throttle the flow of liquid contained in said compression chamber to the hydropneumatic assembly overlying the respective compression chamber and to prevent the passage of the liquid contained in the hydropneumatic assembly to the respective compression chamber of the cylinder underlying said hydropneumatic assembly, and passage means between said compression chamber and said other duct permitting the liquid contained in the compression chamber of each cylinder to flow into said other duct formed through said tubular wall of said cylinder through a passage gradually decreasing in cross-sectional area as the corresponding piston rises in said cylinder above the level of said inlet port of said other duct opening into the compression chamber of said cylinder and obturates said inlet port, a pipe line interconnecting the compression chambers of the two cylinders and a damping device mounted in said pipe line for throttling the liquid flowing therethrough.

3. A hydro-pneumatic suspension unit as set forth in claim 2, wherein said passage means consists of a clearance provided between said cylindrical piston and said cylinder in relative sliding engagement.

4. A hydro-pneumatic suspension unit as set forth in claim 2, wherein said passage means consist of radial ports formed through said tubular wall of the cylinder for connecting said compression chamber to said other duct, said radial ports having gradually and successively decreasing cross-sectional areas above said inlet orifice connecting said compression chamber to said other duct.

References Cited in the file of this patent

UNITED STATES PATENTS

| | | |
|---|---|---|
| 1,861,821 | Schaum | June 7, 1932 |
| 2,481,150 | Pifer et al. | Sept. 6, 1949 |
| 2,757,376 | Brueder | July 31, 1956 |
| 2,781,869 | Boehm et al. | Feb. 19, 1957 |
| 2,850,276 | Jackson | Sept. 2, 1958 |
| 2,887,324 | Jackson | May 19, 1959 |